US006278581B1

United States Patent
Egawa et al.

(10) Patent No.: US 6,278,581 B1
(45) Date of Patent: *Aug. 21, 2001

(54) FLOATING MAGNETIC HEAD HAVING A MAGNETIC HEAD CORE FIXED TO A SLIDER SIDE SURFACE

(75) Inventors: Motoji Egawa; Kazutoshi Takayanagi; Akio Takayama; Tetsuji Fujita; Akinobu Sano, all of Iwata-gun (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/391,472

(22) Filed: Feb. 21, 1995

Related U.S. Application Data

(63) Continuation of application No. 08/059,297, filed on May 11, 1993, now abandoned.

(30) Foreign Application Priority Data

| May 28, 1992 | (JP) | 4-162005 |
| Aug. 27, 1992 | (JP) | 4-252147 |
| Aug. 28, 1992 | (JP) | 4-254169 |
| Nov. 11, 1992 | (JP) | 4-326060 |

(51) Int. Cl.$^7$ .................................................. G11B 5/60
(52) U.S. Cl. .................................................. 360/234.8
(58) Field of Search ........................ 360/102–103, 360/234.8

(56) References Cited

U.S. PATENT DOCUMENTS

| 3,229,268 | 1/1966 | Solyst | 360/103 |
| 3,956,771 | * 5/1976 | Barnes et al. | 360/127 |
| 4,393,428 | 7/1983 | Fujimara | 360/125 |
| 4,488,195 | 12/1984 | Yanagiuchi et al. | 360/125 |
| 4,682,254 | 7/1987 | Hashimoto et al. | 360/125 |
| 4,711,018 | 12/1987 | Matsuzawa | 360/125 |
| 4,745,507 | 5/1988 | Otomo et al. | 360/123 |
| 4,870,520 | 9/1989 | Shaw | 360/103 |
| 4,870,521 | 9/1989 | Okabayashi | 360/103 |
| 5,021,910 | 6/1991 | Murakami | 360/123 |
| 5,043,833 | 8/1991 | Aikawa et al. | 360/103 |
| 5,091,810 | * 2/1992 | Kakizaki et al. | 360/103 |
| 5,136,444 | * 8/1992 | Maki et al. | 360/103 |
| 5,301,077 | * 4/1994 | Yamaguchi et al. | 360/103 |
| 5,349,487 | * 9/1994 | Egawa et al. | 360/103 |
| 5,359,479 | * 10/1994 | Karam, II | 360/103 |
| 5,359,481 | * 10/1994 | Egawa | 360/103 |

FOREIGN PATENT DOCUMENTS

| 0075927 | * 4/1987 | (JP) | 360/103 |
| 1-211211 | * 8/1989 | (JP) | 360/103 |
| 1-260606 | * 10/1989 | (JP) | 360/103 |
| 0276421 | * 11/1989 | (JP) | 360/103 |
| 3-130913 | * 6/1991 | (JP) | 360/103 |
| 209617 | 9/1991 | (JP) . | |
| 028010 | 1/1992 | (JP) . | |
| 4-003308 | * 1/1992 | (JP) | 360/103 |
| 222916 | 8/1992 | (JP) . | |

* cited by examiner

Primary Examiner—Brian E. Miller
(74) Attorney, Agent, or Firm—Oliff & Berridge, PLC (57) ABSTRACT

A floating magnetic head comprising a substantially rectangular slider made of a non-magnetic substance and having leading and trailing ends. The slider is provided with a groove which gradually increases in depth along one side of the slider extending toward the trailing end and has an opening at the trailing end. The slider has rails mounted on a surface of the slider that is opposite to a magnetic recording medium to produce a floating force. A magnetic head core is bonded to one side of the slider. The core has a read/write gap, first and second legs, an inclined face opposite to the bonding surface, and a track width on the surface opposite to the magnetic recording medium. The second leg is located at the trailing end of the slider without protruding from the trailing end.

2 Claims, 10 Drawing Sheets

FLOATING MAGNETIC HEAD HAVING A MAGNETIC HEAD CORE FIXED TO A SLIDER SIDE SURFACE

This is a Continuation of application Ser. No. 08/059,297 filed May 11, 1993, now abandoned.

BACKGROUND OF THE INVENTION

1. Field of the Invention

The present invention relates o improvements in a floating magneic head used in a hard disk drive and, more particularly, to improvements in a floating magnetic head of the composite type.

2. Description of the Prior Art

Figure 17:
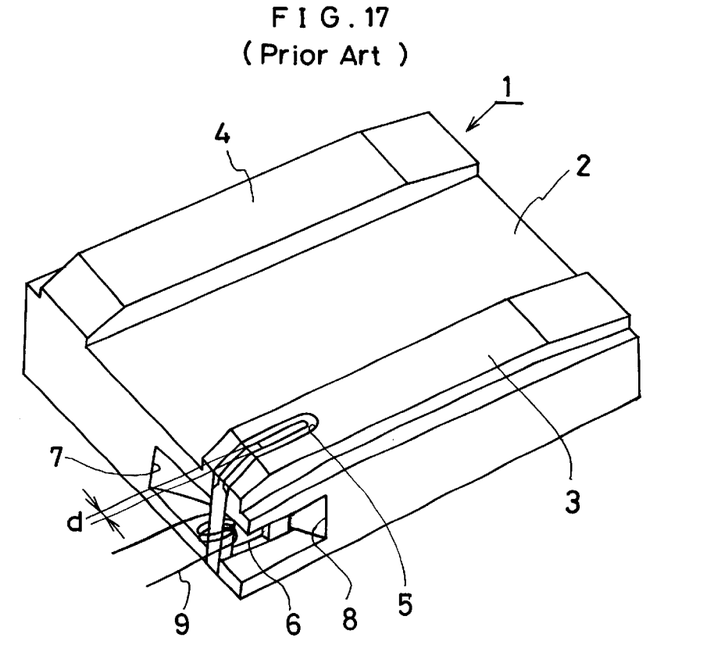
FIG. 17 is a perspective view of a conventional floating magnetic head.

A floating magnetic head of the composite type which has been heretofore frequently used is generally indicatd by reference numeral 1 in FIG. 17. This head 1 comprises a slider 2 made of barium titanate or calcium titanate together with rails 3 and 4 disposed on opposite sides of the slider 2. The top surfaces of the rails 3 and 4 form floating surfaces.

One rail 3 has a slit 5 of a given depth, the slit 5 extending in a direction perpendicular to the direction in which a magnetic recording medium (not shown) moves. A head core 6 made of a ferromagnetic substance such as a ferrite is inserted in the slit 5. The core 6 is rigidly mounted by sealing of glass or other means. Indicated by d is the track width. The slider 2 is provided with two cutouts 7 and 8 forming windows on opposite sides of the slit 5 receiving the head core 6. A coil 9 is wound on that portion of the core 6 which faces the windows 7 and 8.

In this conventional floating magnetic head 1 of this structure, the head core 6 is treated as an independent part until it is inserted into the slit 5 and so it has been difficult to reduce the thickness of the core below 100 microns. To cope with High frequency signals, the head core 6 must be made thinner. However, this thinning has been very difficult to accomplish.

Also, it has been necessary to measure the apex of the head core 6 sealed with glass. To adjust the height of the throat, it has been necessary to make a measurement obliquely via the glass inside the slit 5. The measurement may be affected by the refractive index of the glass or local distortion in the glass.

In recent years, the track width d has been reduced below 10 microns. Therefore, the ratio of the amount of the glass filled in the track width-adjusting groove in the head core 6 to the track width increases. Consequently distortion due to differences in coefficient of thermal expansion among the glass, the slider, and the head core (often consisting of a ferrite) increases, thus deteriorating the efficiency of the core 6.

Thus, to make the head core 6 cope with High frequency signals while maintaining the conventional shape, if the thickness is reduced, it is necessary to reduce the width of the slit 5. Therefore, it has been difficult to increase the depth of the slit beyond 1 mm, the slit having a thickness less than 100 microns. If only the thickness of the core is decreased while maintaining the large width of the slit, then the gap is increased. This increases the amount of glass loaded, thus further increasing the characteristic variations due to the differences in coefficient of thermal expansion. Another problem is that it is difficult to load the glass without creating a gas between the slider 2 and the head core 6 and without producing bubbles.

It is a first object of the present invention to provide a floating magnetic head which is free of the foregoing problems with the prior art techniques, is easy to fabricate, and has excellent High frequency characteristics.

This object is achieved by a first structure which is described later in connection with a first and second examples of the invention.

A second structure of the invention is an improvement over the first structure. In particular, where the head core is exposed, when the winding 9 is mounted or the core is mounted to a suspension in a following step, or when the hard disk drive is mounted or the core is mounted to a suspension in a following step, or when the hard disk drive is mounted or otherwise treated, distortion or impact directly acts on the head core 6. As a result, the core 6 may get damaged or the characteristics may be deteriorated. Furthermore, the winding 9 tends to be disarranged. The disarranged winding 9 may come into contact with the disk, resulting in electrical leakage, breakage, or other trouble. Generally, a bobbin (not shown) is used to prevent the winding from being disarranged or to prevent layer short between the wire of the winding 9 and the head core 6. There arises the possibility that the core 6 is damaged. Accordingly, it is a second object of the invention to provide a floating magnetic head which has a reinforced head core to prevent damage and characteristic deterioration and which suppresses disarrangement of the winding 9, thus preventing electrical leakage and breakage.

Conventionally, in floating magnetic head, a CSS (Contact Start Stop) system is employed, in which the magnetic head is floated by 0.1–0.3 $\mu$m from the medium surface while the medium such as a disk rotates at high speed and the sliding surface of the magnetic head 1 is pushed onto the surface of the medium while it stops. During the above operation, since it tends to occur that at the time of CSS operation the surface of the medium is damaged by the edge portion 39 of the slider 2 illustrated in FIG. 1, so that it is desired to avoid such damage i.e. to increase the characteristics of CSS. To this object, there has been carried out on the edge portion 39 of the slider 2 or on the edge of the magnetic head core 6 so as to increase such characteristics of CSS.

Figure 1:
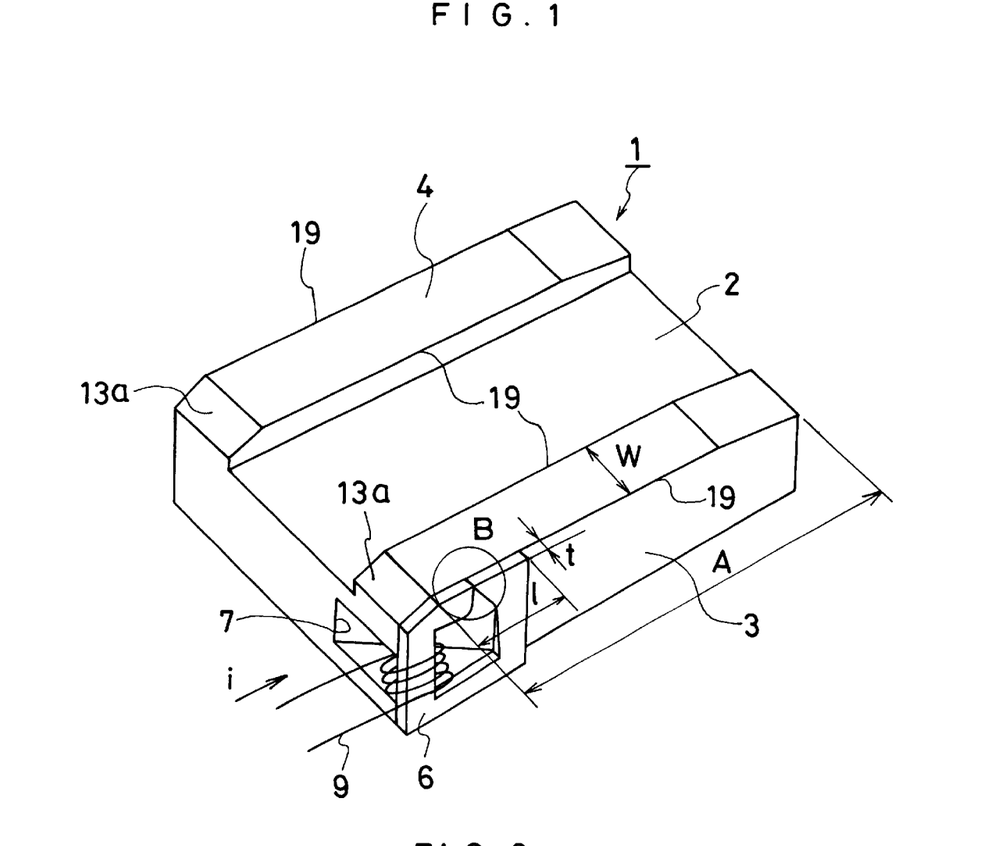
FIG. 1 is a perspective view of a first example of magnetic head according to the invention.

Further, to the above floating magnetic head 1, there have been ideas to chamfer the edge portions 39 of the slider 2 or the edge portion of the magnetic head core 6, however, it may chamfer also the edge of the head core 6, which deteriorates the track width t in FIG. 1.

Accordingly, the third object of the present invention is to provide a floating magnetic head which is prevented from being deteriorated in its width so as to increase the CSS characteristics.

SUMMARY OF THE INVENTION

The first object is achieved by a floating magnetic head comprising: a slider made of a nonmagnetic material and having rails on its surface opposite to a magnetic recording medium to produce a floating force; and a head core which is integral with the slider, has a read/write gap, and is disposed on the outside of the slider.

The first object is also achieved by a magnetic head comprising: a slider made of a nonmagnetic material and having rails on its surface opposite to a magnetic recording medium to produce a floating force; a head core which has a read/write gap and is bonded to the outside of the slider ; a substrate consisting of a central portion of a nonmagnetic material and side portions made of a magnetic material and disposed integrally with the central portion on opposite sides of the central portion; a magnetic core extending over the nonmagnetic central portion; a magnetic core extending over the nonmagnetic central portion of the substrate and magnetically coupled to the side portions of the substrate and magnetically coupled to the side portions of the substrate and magnetically coupled to the side portions of the substrate; a coil of a thin-film conductor wound around the core and mounted on the substrate; a thin-film conductor assembly which consists of the substrate, the magnetic core, and the coil and which is bonded to the head core on the opposite side of the slider.

The second object is achieved by a floating magnetic head comprising: a slider made of a nonmagnetic material and having rails on its surface opposite to a magnetic recording medium to produce a floating force; a head core which has a read/write gap and is bonded to the outside of the slider; and a support member that supports the winding on the head core and is bonded to the head core on the opposite side of the slider.

In one feature of the invention, the support member is provided with a recess receiving the winding on the head core.

The support member and the slider may be made of the same material. Also, the support member may be partially cut out so that the apex of the head core can be exposed. Furthermore, the support member may be provided with a cover that is so shaped that it covers the corners of the winding on the head core.

In order to achieve the third object, in a floating magnetic head comprising a slider made of a nonmagnetic material and having rails on its surface opposite to a magnetic recording medium to produce a floating force, and a head core which is integral with the slider, has a read/write gap, and is disposed on the outside of the slider, the head is characterized in that the edge portion of the floating surface of the slider is chamfered.

DESCRIPTION OF THE PREFERRED EMBODIMENT

A first example of the present invention is now described by referring to FIG. 1. It is to be noted that like components are indicated by like reference numerals in various figures. The great feature of the fundamental structure of the novel magnetic head is that the head core 6 is mounted on the outside of the slider 2, i.e., at one side of the rail 3. Therefore, the rail 3 is provided with no slit. The slider 2 is made of an oxide ceramic or other material. The material of the slider 2 is selected, taking account of the hardness, the coefficient of thermal expansion, the density, the denseness, and the degree of easiness with which a magnetic recording medium makes a sliding contact with the slider 2, and other factors. Generally, the slider 2 is often made of a ceramic of calcium titanate.

Figure 2:
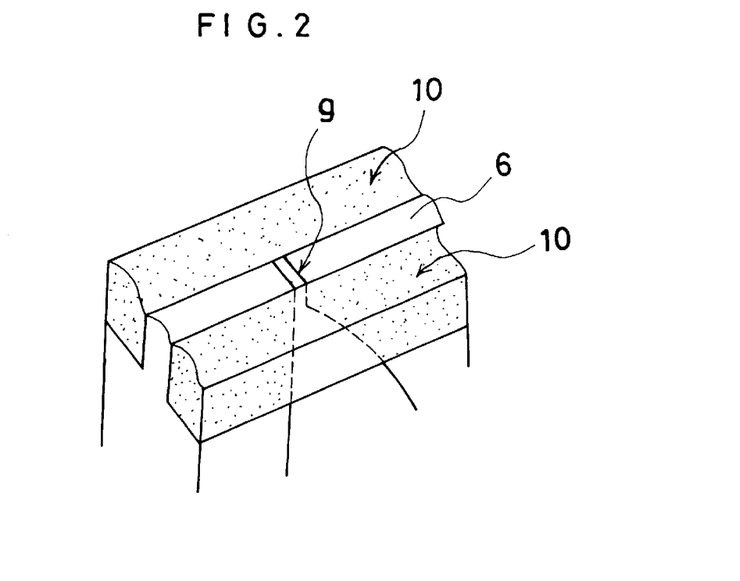
FIG. 2 is a fragmentary perspective view of the magnetic head shown in FIG. 1, showing the surface of the head core.

In this example, the thickness t of the head core 6 exposed to the rail surface is less than one seventh of the rail width w of the slider 2. The width a of the head core 6, or the dimension of the core taken in the direction in which the medium moves, is set less than one half of the width A of the slider 2 taken in the direction of movement of the medium. The head core 6 and the slider 2 are substantially identical in height. The core 6 is made of a magnetic ferrite. Only those portions of the core 6 which are close to the running plane of the medium are protected with a glass layer 10, and a track is formed. The portion B of FIG. 1 is shown to a large scale in FIG. 2. The gap is indicated by g in FIG. 2.

In the floating magnetic head 1 constructed in this way, the head core 6 is magnetized by passing an electrical current i through the coil 9. Information is written to a magnetic disk media (not shown) or read from the magnetic disk media by this magnetization. The head 1 is the same as the prior art floating magnetic head in these fundamental points but produce the following features due to its novel structure.

Since the head core 6 is mounted on the outside of the slider 2, it is not necessary to form a thin slit in the slider 2. Also, the core 6 can be machined into a thin form after being adhesively bonded to the slider 2 and so head cores which are much thinner than conventional cores can be manufactured with high production yield. Consequently, a magnetic head which produces a less amount of eddy current loss and can accommodate High frequency signals can be fabricated.

With respect to the bonding of the head core 6 to the slider 2, a thin adhesive layer of a thickness on the order of several microns or less can be readily obtained by forming a thin glass film on the slider by sputtering techiques. Furthermore, the height of the throat can be measured directly, because the core 6 is mounted on the outside. Since the core 6 can be thinned, the capacity of the track-adjusting groove can be reduced. This makes it possible to reduce the amount of glass inside the groove.

Figure 3:
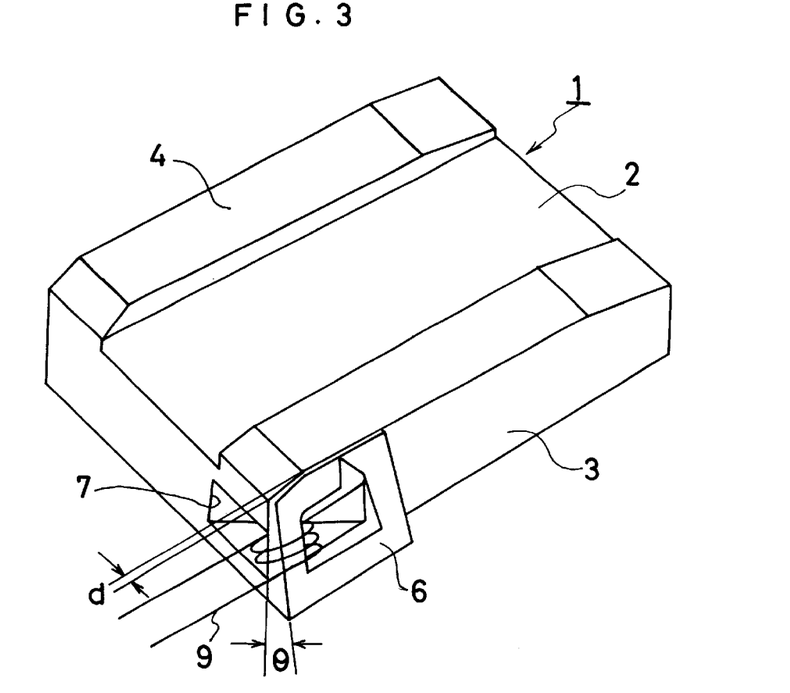
FIG. 3 is a perspective view of a second example of magnetic head according to the invention.

Referring to FIG. 3, there is shown a second example of the invention. In this example, the side surface of the head core 6 that is opposite to the surface bonded to the slider 2 is cut out obliquely and agrees with the track width at the surface with which the medium makes a sliding contact. Instead of forming the side surface obliquely, it can be formed like steps or stairs. In this example, after adhesively bonding the head core 6 to the side surface of the slider 2, the core 6 can be machined obliquely at an angle of θ (θ is within the range from 1 degree to 10 degrees) to bring the front end into agreement with the track width.

In addition to the numerous features described above, glass is dispensed with exception for the glass used for bonding. Therefore, the effect of the glass is negligible. Consequently, commercial products up to the final fabrication step. Micromachining techniques such as ion milling from the side surface can be utilized to improve the accuracy of the track width.

Figure 4:
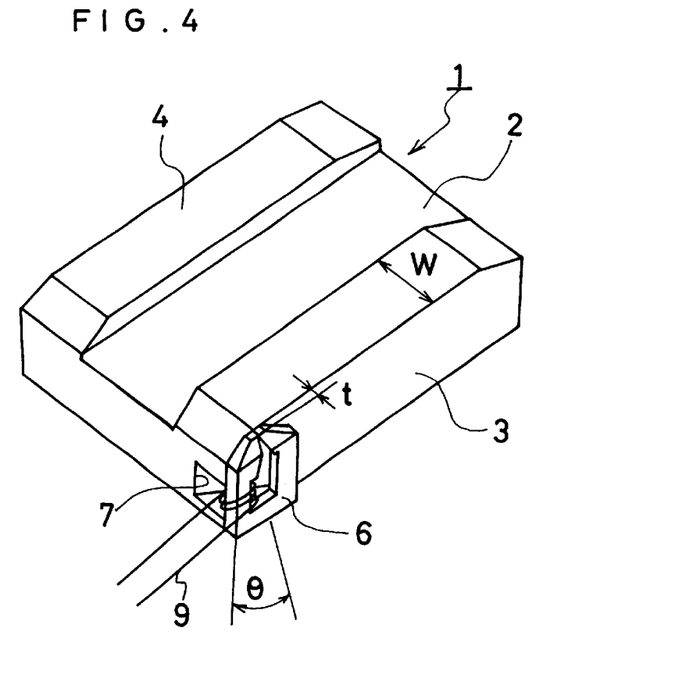
FIG. 4 is a perspective view of a third example of magnetic head according to the invention.

Referring o FIG. 4, there is shown a third example of the invention. In this examples only that portion of the side surface of the head core 6 which is close to the magnetic recording medium is obliquely cut out. This side surface is made coincident with the track width at the surface with which the medium makes a sliding contact. Instead of forming the side surface obliquely, it can be formed like steps or stairs. In this example, after slider 2, the core 6 can be machined obliquely at an angle of θ (θ is within the range from 15 degrees to 45 degrees) to bring the front end into agreement with the track width.

Figure 5:
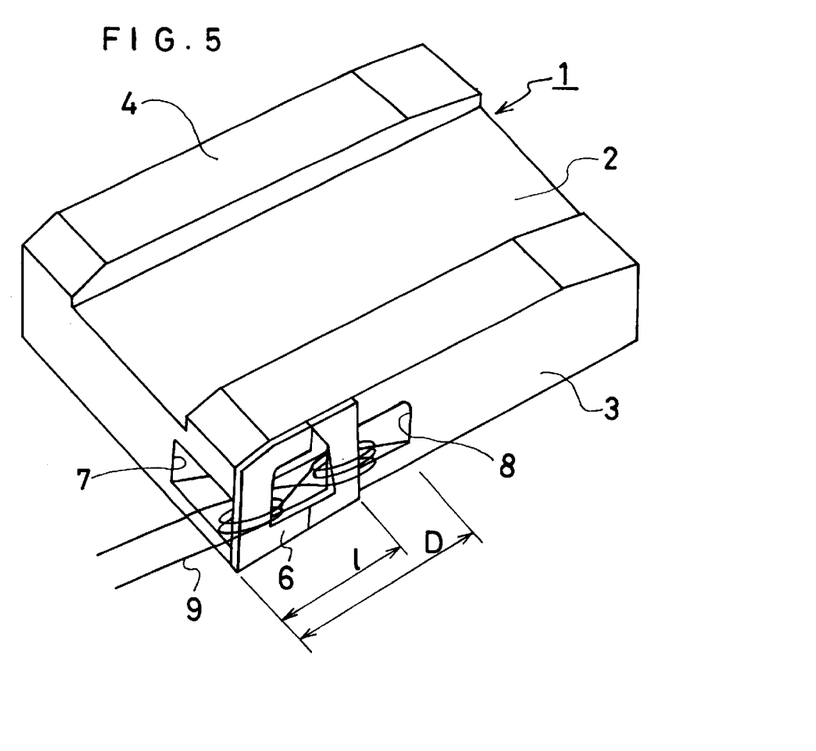
FIG. 5 is a perspective view of a fourth example of magnetic head according to the invention.

Referring to FIG. 5, there is shown a fourth example of the invention. In this example, the slider 2 has a cutout portion forming a window 8. The depth D of this window 8 is in excess of the width l of the core 6 taken in the direction of movement of the medium. The coil 9 can be wound on both entering portion and outgoing portion of the core 6. This structure yields the aforementioned features. In addition, the coil 9 can be wound on both sides of the core 6 and, therefore, the effect of external magnetic field can be cancelled out. Furthermore, the output power per turn of the coil can be increased, since the coil 9 makes a more intimate contact with the core 6.

Figure 6:
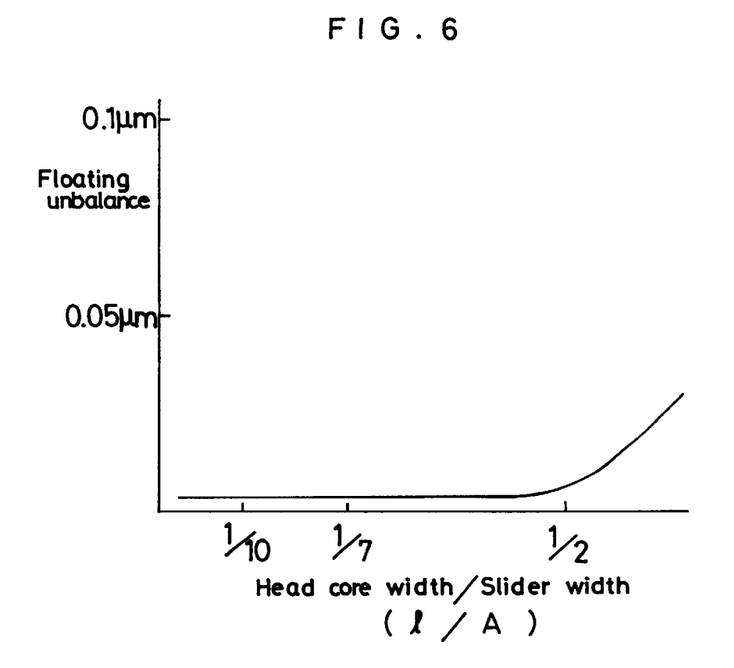
FIG. 6 is a graph showing the relation between the head core width/slider width and the value of floaing unbalance.
Figure 7:
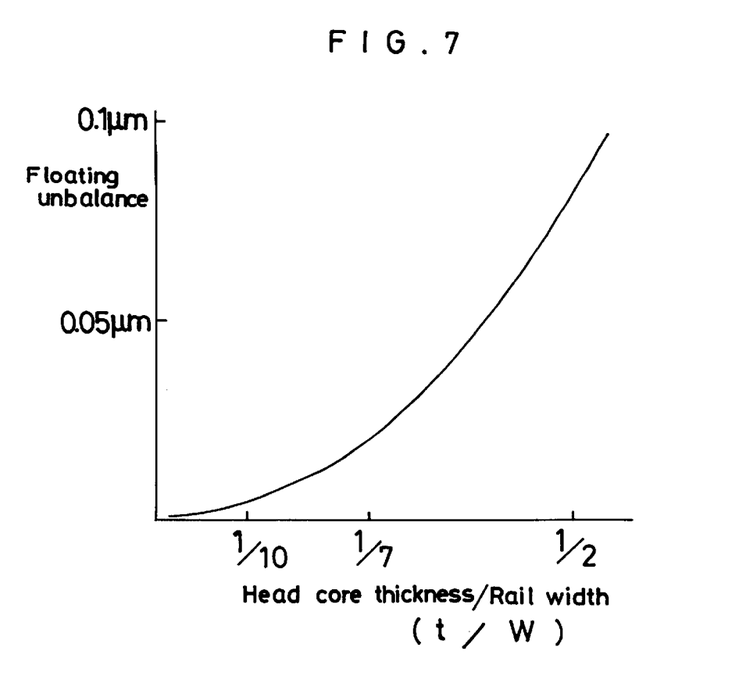
FIG. 7 is a graph showing the relation between the head core thickness/rail width and the value of floating unbalance.

FIG. 6 is a graph in which the ratio of the width l of the head core exposed to the rail surface to the slider width A is plotted on the horizontal axis, while the value of the floating unbalance is plotted on the vertical axis. FIG. 7 is a graph in which the ratio of the thickness t of the head core exposed to the rail surface to the rail width W is plotted on the horizontal axis, while the value of the floating unbalance is plotted on the vertical axis. It can be seen from FIG. 6 that the value of the floating unbalance stabilizes at a small varies, the rate of variation is substantially constant.

In the novel floating magneic head described above, the head core protrudes from the side of the slider 2, thus creating a possibility of a difference between the rail widths. However, no practical problems arise if the thickness of the head core 6 exposed to the rail surface is reduced to such an extent that the thickness of the head core 6 can be negligible compared with the rail widths. Experiment shows that problems by no means occur if the thickness is less than one seventh of the rail width and the width of the head core 6 exposed to the rail surface is in excess of one half of the width of the slider rail 2, as shown in FIGS. 6 and 7. Where the width of the head core 6 exposed to the rail surface is in excess of one half of the width of the slider 2, the rail widths may be unbalanced by an amount corresponding to the thickness of the head core 6. One might consider that the floating surface cannot be blended because the head core 6 exists on the outside. However, no problem takes place except for the examples described in conjunction with FIGS. 3 and 4, because the track edges are loaded with glass and blending not reaching the track is possible. Furthermore, in the examples of FIGS. 3 and 4, after blending by an oblique surface working a blending of the edge portion of the rail except for the track edge is able to be processed for blending.

Figure 8:
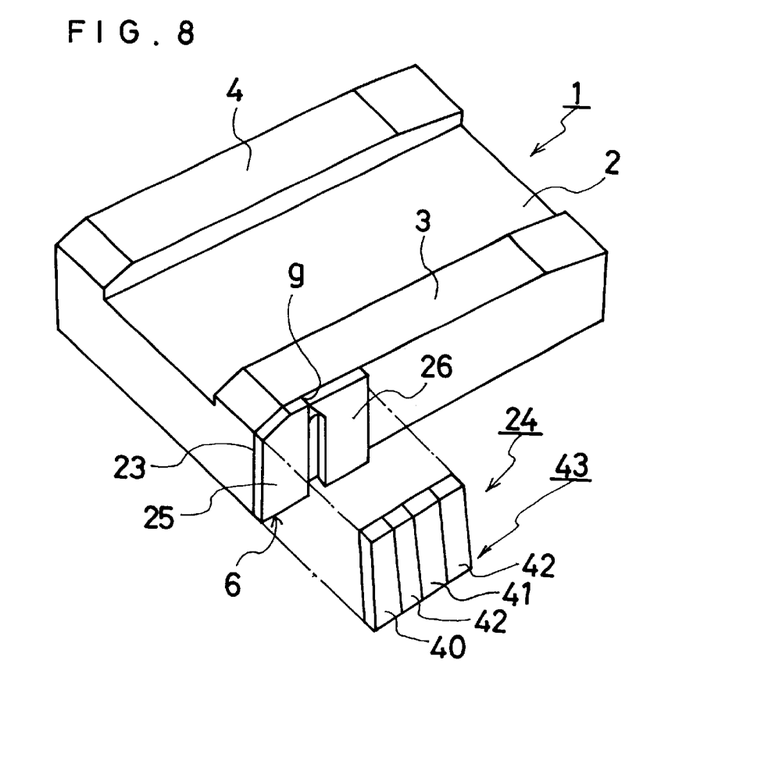
FIG. 8 is a perspective view of a fifth example of magnetic head according to the invention.
Figure 18:
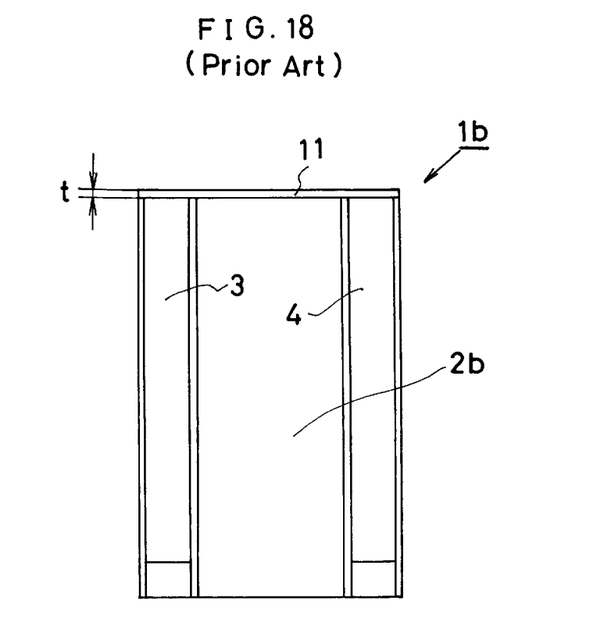
FIG. 18 is a plane view of a conventional floating magnetic head.
Figure 19:
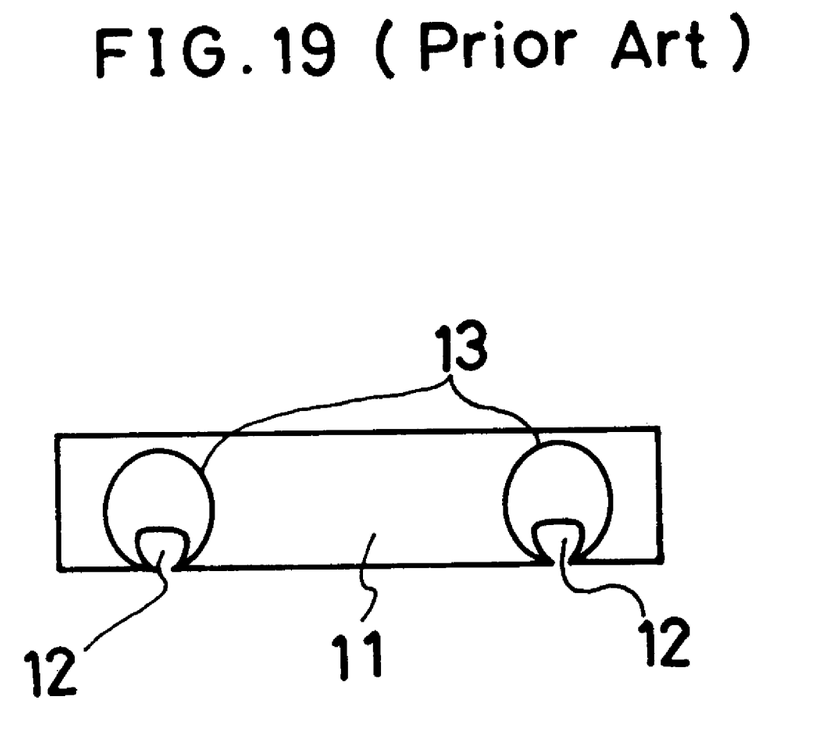
FIG. 19 is a front view of FIG. 18.

FIG. 8 is a perspective view of a fifth example of the invention. In this example, a novel magnetic head is fabricated by the use of a thin-film coil instead of a wound conductor coil. Conventional examples of this thin-film magnetic coil are shown in FIGS. 18 and 19. In FIG. 18, the conventional thin-film magnetic head, generally indicated by 1b, comprises a thin magnetic head member 11 of a thickness t at one end of a slider 2b. This head member 11 has magnetic head core 12, as shown in FIG. 19. A thin-film conductor coil 13 is formed in the small thickness t.

The above described thin-film magnetic head b having the magnetic head member 11 solves the problem with the magnetic head using a wound conductor coil but presents the following problems. In this thin-film magnetic head 1b, the thin-film conductor coil 13 is built inside the magnetic head member 11 of a small thickness of t. Therefore, the cross-sectional area of the thin-film conductor coil 13 is small and thus the electric resistance is large. Consequently, the induced electromotive force is small. As a result, the writing and reading characteristics are deteriorated.

Figure 9:
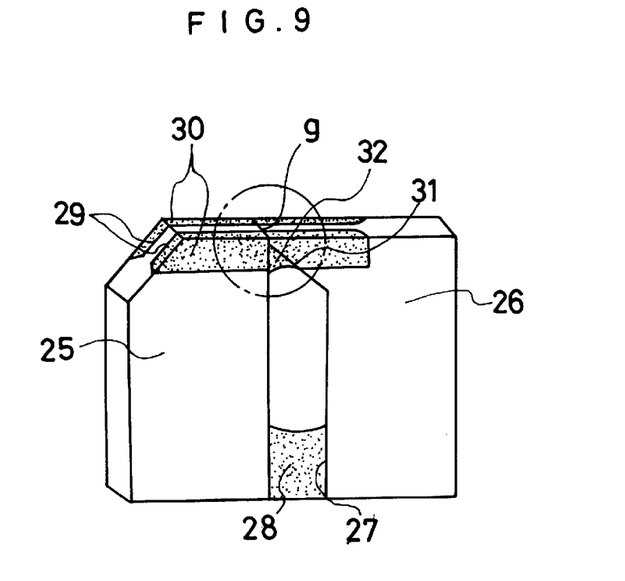
FIG. 9 is a perspective view of the head core of the magnetic head shown in FIG. 8.

A fifth example of magnetic head according to the invention is next described by referring to FIGS. 8–11. As already described, like components are denoted by like reference numerals in various figures. In FIGS. 8 and 9, the magnetic head, generally indicated by reference numeral 1, comprises a substantially rectangular slider 2. Rails 3 and 4 for producing a floating force are mounted on the top surface of the slider 2 which is opposite to a magnetic recording medium. A head core 6 (25, 26) having a read/write gap g is bonded via glass to the side, or the outside, of the slider 2 which is on the side of one rail 3, A thin-film coil assembly or thin-film conductor assembly 24 is joined to the surface of the core 26 that is opposite to the surface 23 bonded to the slider. In assembling the magnetic head, the head core 26 is machined into a thin form after the cores 25,26 are bonded to the slider 2 via a resin or eutectic alloy such as Au—Sn.

As shown in FIGS. 8 and 9, the head core 6 comprises a pair of magnetic members 25 and 26 disposed in an opposite relation to each other, The read/write gap g is formed above (at the top of FIG. 9) the interface between the two magnetic members 25 and 26. An air gap 27 is filled with a nonmagnetic substance 28 such as glass. Thus, the magnetic circuit formed by the gap g and the magnetic members 25 and 26 is magnetically isolated. The magnetic members 25 and 26 are provided with recesses 29 at both sides of their upper portions (at the tip of FIG. 9). The recesses 29 are filled with glass 30. Also, the magnetic members 25 and 26 are provided with air gap 31 below the read/write gap g. These air gap 31 is filled with an adhesive 32 such as glass to bond together the magnetic members 25 and 26. Instead of filling the air gaps 27 with the nonmagnetic substance 28, the gaps 27 may be left hollow. Furthermore, instead of the recesses 29 defining the track width, as shown in FIGS. 3 and 4, an oblique cutout may be used.

Figure 10:
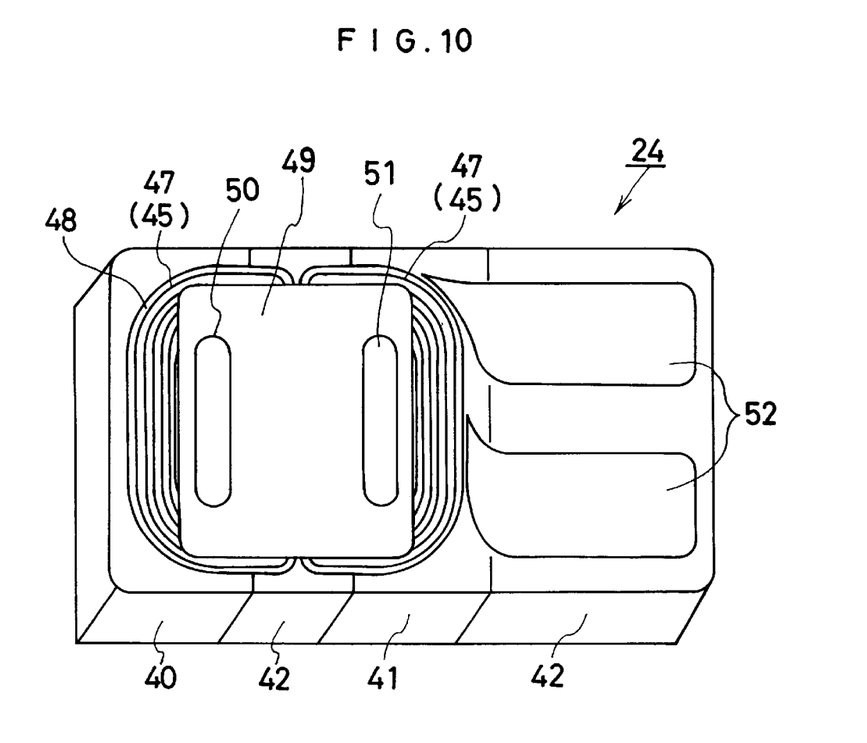
FIG. 10 is a partially cutaway perspective view of the thin-film coil assembly of the magnetic head shown in FIG. 8.

The structure of the thin-film coil assembly 24 is described by bonding together two magnetic members 40 and 41 via a nonmagnetic member 42 such as glass, the magnetic members being made of a ferrite. Aternatively, the substrate 43 is fabricated by machining a groove in a magnetic member, inserting molten glass into the groove, allowing the glass to solidify, and then mirror-polishing both sides of the magnetic member.

Figure 11:
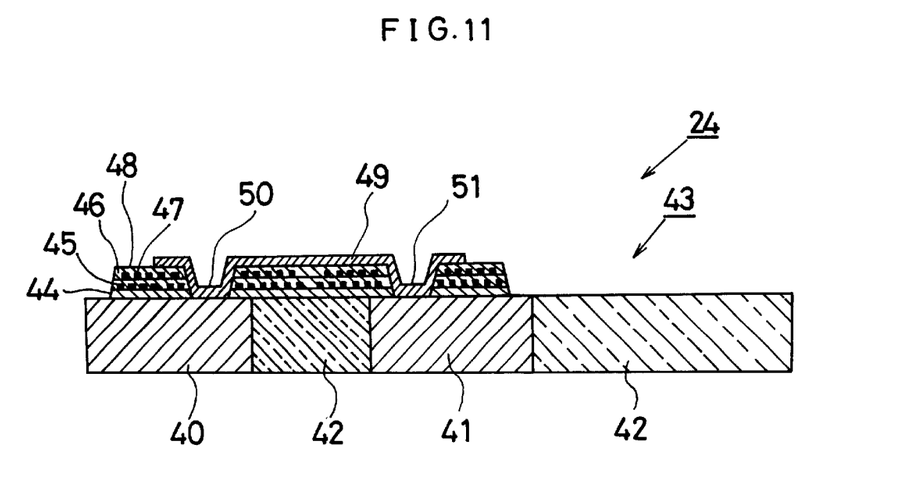
FIG. 11 is a cross-sectional view of the thin-film coil shown in FIG. 10.

A first insulating film 44 is formed on the mirror-polished surface of the substrate 43. Then, a first layer 45 forming a thin-film coil is formed on the first insulating film 44 by the known techniques. A second insulating film 46 is formed on the first layer 45 forming the thin-film coil. Thererafter, a second later 47 forming a thin-film coil is formed on the second insulating film 46. A third insulating 48 is formed on the second layer 47. Thererafter, a thin film 49 forming a magnetic core is formed on the third insulating film 48.

The first insulating film 44, the second insulating film 46, and the third insulating film 48 are made of an insulating organic resin such as photoresist or polyimide or an inorganic substance such as $SiO_2$ or $Al_2O_3$. The first layer thin-film coil 45 and the second layer thin-film coil 46 are formed either by flame plating in which copper plating is performed, using a resist flame or by etching, using a photoresist mask, after the magnetic film is formed by evaporation, sputtering, or other process.

The first layer thin-film coil 45 and the second layer thin-film coil 46 are spirally wound on magnetic cores 50 and 51, respectively. Indicated by 52 are bonding pads.

In the magnetic head constructed in this way, the thin-film coil assembly 24 is joined to the surface of the head core 22 that is opposite to the surface 23 bonded to the slider. This in turn results in a decrease in the magnetic resistance of the core 22. The induced electromotive force is increased accordingly. As a result, the reading and writing characteristics can be improved. Also, the use of the thin-film coil assembly 24 permits miniaturization of the whole device.

Since the head core 26 is mounted on the outside of the slider 2, it is not necessary to form a slit in the slider 2. This improves the productivity. After the head core 26 is bonded to the slider 2, the core 26 is machined into a thin form. Therefore, the core 26 itself can be made in relatively large thickness (more than 100 microns). After the bonding, the core 26 can be machined into a thin form (less than 100 microns). Therefore, the eddy current decreases, thus improving the High frequency characteristics.

Because the capacity of the track-adjusting groove decreases, the amount of the glass filling the groove decreases. Therefore, distortion due to differences in coefficient of thermal expansion among the glass, the slider 2, and the head core 26 is reduced accordingly.

The thin-film coil assembly 24 can be easily fabricated by the generally adopted semiconductor integrated circuit fabrication techniques. In consequence, the thin-film coil assembly 24 and hence the whole device can be mass-produced.

Since the first layer thin-film coil 45 and the second layer thin-film coil 46 are spirally wound on the magnetic cores 50 and 51, respectively, balanced windings are possible. Consequently, extraneous noise can be canceled out.

Figure 12:
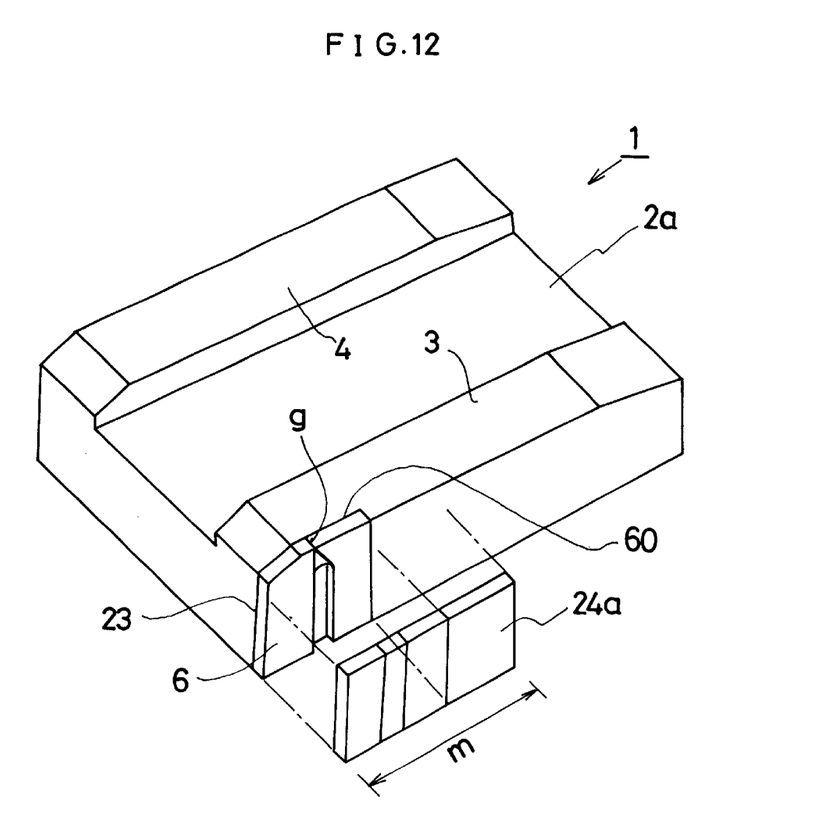
FIG. 12 is a perspective view of a six example of magnetic head according to the invention.

Referring next to FIG. 12, there is shown a sixth example of magnetic head according to the invention. This magnetic head, indicated by numeral 1, is similar to the magnetic head 1 of the first example except for the following points. Instead of the slider 2 of the first example, the magnetic head of the sixth example has a slider 2a provided with a notch 60 having a depth corresponding to the thickness of the head core 6. The core 6 is placed in this notch 60 and bonded to the slider. In this way, the side surface of the core 6 opposite to the surface 23 bonded to the slider and the side surface of the slider 2a are made coplanar with each other. Instead of the above-described thin-film coil assembly 24, a thin-film coil assembly 24a having a length m larger than that of the assembly 24 is provided. This is permitted by the fact that the side surface of the head core 6 is coplanar with the side surface of the slider 2a as mentioned previously.

This sixth example yields the same advantages as those offered by the fifth example. In addition, the increased length m of the thin-film coil assembly 24a provides greater allowance in fabricating the pattern of the coil assembly 24a. The degree of freedom with which the magnetic head is designed is increased accordingly.

The advantages of the first through sixth examples are collectively described below while comparing them with the prior art techniques.

1. Many floating magnetic heads have the CSS(constact start stop) system. Therefore, it is required that the resistance to the CSS system be improved to prevent the surface of a magnetic recording medium from being damaged by the edge of the slider. Consequently, the material of the slider is so selected as to accommodate the used magnetic disk. In the prior art floating magnetic head of the composite type, the magnetic head core is inserted in the slit. Therefore, the selection of the material of the magnetic head core, the material of the slider, and the material of the loaded glass are important.

In the novel floating magnetic head, the magnetic head core is mounted on the outside of the slider and so it is only necessary that the material of the slider be selected so as to accommodate the magnetic disk. Hence, more option can be had. Similarly, the material and the structure of the magnetic head core can be selected from a great choice of materials and structures. For instance, a magnetic head core comprising laminated magnetic thin-metal films can also be employed.

2. In the prior art composite type, a magnetic head core is inserted into a narrow slit in the slider and bonded via glass. To improve the fluidity of the glass, it is necessary to melt it at a high temperature and to cause it to flow into the slit. This means that the high-temperature glass erodes the head core. Especially, Those portions of the core which are located on the side of the entrance of the slit are exposed to a large amount of glass. These portions which determine the track width of the magnetic head core on the side of the entrance are affected greatly. This has imposed one condition in selecting the material of the core. In the novel floating magnetic head, the head core is structurally eroded less by the glass. Consequently, even those core materials which are easily eroded can be used.

3. In the second and third examples, the machining operation for determining the track width of the magnetic head is performed after mounting the magnetic head core on the slider. Therefore, during manufacturing process, the core is less damaged than in the fabrication of the prior art composite-type floating magnetic head in which a very thin core having a machined track width is inserted into the slit.

4. Further, in the second and third examples, since the track width can be machined in the final step, commercial products having different track widths can be manufactured as one lot until the step for machining the track widths is carried out.

5. It is not necessary to lap both sides like the prior art composite-type floating magnetic head; it suffices to lap only one side.

6. Because of the features 4 and 5 described above, the novel magnetic head gives more flexibility in constructing the production line than the prior art composite-type floating magnetic head.
7. In the prior art composite-type floating magnetic head, the magnetic head core is inserted into the slit in the slider. A glass which is melted and fluidized at a high temperature is passed into the slit to mount the magnetic head core and the slider. Then, the surface of the slider is lapped. This lapping operation varies the track width. Accordingly, the track width of the magnetic head core is machined, taking account of the lapping operation performed after the core is mounted on the conventional composite-type slider. Then, the core is mounted in the slit formed in the slider. In this method, the accuracy of the track width presents problems. In the novel floating magnetic head, the track width is machined after the core is mounted on the slider and, therefore, the track width can be machined accurately.
8. In the novel floating magnetic head, the material which bonds together the magnetic head core and the slider is very thin and hence is hardly exposed to the air bearing surface. Consequently, a step due to glass erosion on lapping is not produced. Also, the material is hardly exposed. Hence, the reliability is high. For the same reasons, an aqueous detergent can be used.
9. Since the amount of the glass used to mount the magnetic head core and the slider is very small, the magnetic head is hardly affected by the bond distortion. Therefore, the reading and writing efficiency does not deteriorate. In addition, since bonding can be carried out at lower temperature, a head core having low heat-durability can be used.
10. One side of the magnetic head core is bonded to the slider, while the other side is exposed and subjected to air flow. Therefore, the heat generated accordingly to the writing current can be dissipated more quickly than in the case of the prior art composite-type floating magnetic head.
11. The height of the throat is not measured via the sealing glass, unlike the prior art composite-type floating magnetic head. The height of the throat can be readily machined accurately. Also, the measurement can be performed accurately.
12. In the forth example, since coils can be wound on both legs of the magnetic head core, the effect of external disturbing magnetic field can be reduced by creating a balanced winding from the coils.
13. The magnetic head core can be made thinner than the prior art composie-type magnetic floating head core and monolithic floating magnetic heads. Hence, the novel magnetic head is less affected by extraneous disturbing electromagnetic fields produced by an electric motor, for example.
14. The slider can be made of an electrically conductive material, a material having a high magnetic permeability, or the like. Therefore, the effect of the extraneous disturbing electromagnetic field can be reduced by the shielding effect.
15. In the novel floating magnetic head, the magnetic head core is mounted on the outside of the slider. This makes it possible to use the outermost portion of the magnetic disk. Also, a thin-film coil can be used easily instead of ordinary winding.
16. Since the magnetic head core is mounted on the outside of the slider, it is easy to shunt the back gap by plating or sputtering of a magnetic material or by other method. Therefore, the electromagnetic conversion efficiency of the magnetic head can be easily enhanced.
17. Metallization can be utilized in bonding together the slider and the magnetic head core. A slider material matching the selected material can be selected.
18. Because the magnetic head core protrudes into the rail of the slider, the shape of the rail can be changed at will.
19. If necessary, an azimuth can be given to the magnetic head core, unlike a thin-film magnetic head and a monolithic magnetic head.

Structures which achieve the second object described above are described hereinafter by referring to FIGS. 13–15. First, a seventh example of floating magnetic head according to the invention is next described by referring to FIG. 13. Like components are indicated by like reference numerals in various figures and those components which have been already described will be not described below. FIG. 14 shows an eighth example.

Both examples can have balanced winding, in the same way as the example described in connection with FIG. 4. Their support members 18 and 19 are so shaped that they do not plug winding windows 20 in the head cores 6. The support member 18 shown in FIG. 13 is made similar in shape to the head core 6 so as to match the core 6. In the floating magnetic head shown in FIG. 14, the support member 19 has a pair of flanges 16 and a pair of recesses 17 for winding.

Figure 13:
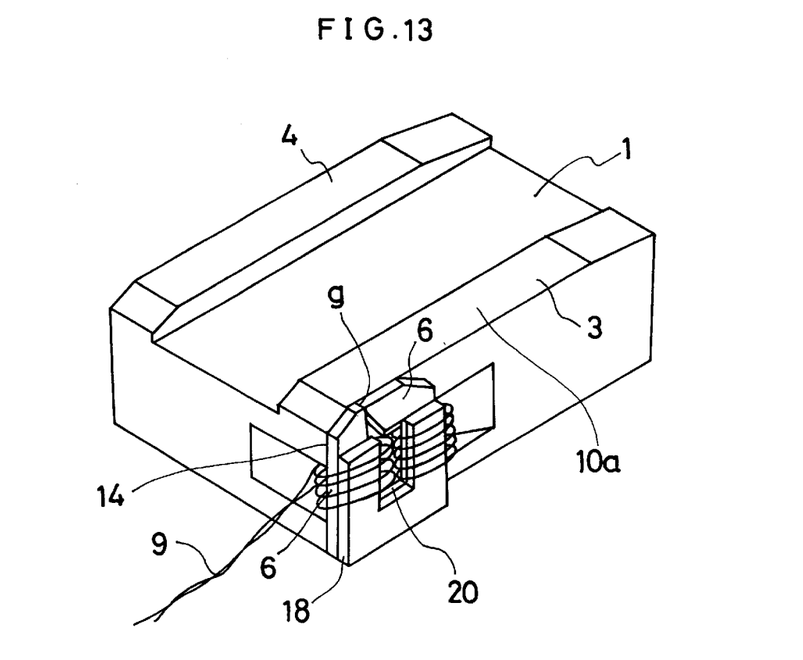
FIG. 13 is a perspective view of a seven example of magnetic head according to the invention.
Figure 14:
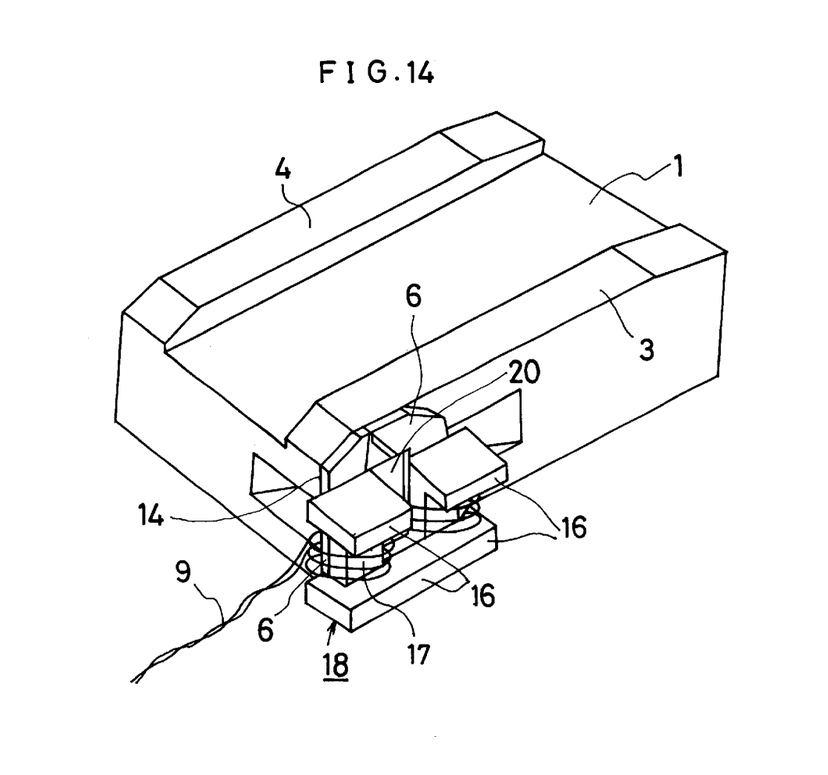
FIG. 14 is a perspective view of a eighth example of magnetic head according to the invention.

In the floating magnetic head shown in FIG. 13, the support member 18 Is bonded to the head core 6 thereby to prevent damage to the head core 6 and deterioration in its characteristics. In the floating magnetic head shown in FIG. 14, damage to the head core 6 and deterioration in the characterstics are prevented by flanges 16, The portion of the winding 9 on the side of the support member 18 is received in the recess 17 formed by flanges 16. Therefore, the winding 9 is firmly held, and disarrangement of the winding is prevented. Hence, electrical leakage, breakage, and other troubles can be prevented.

Figure 15:
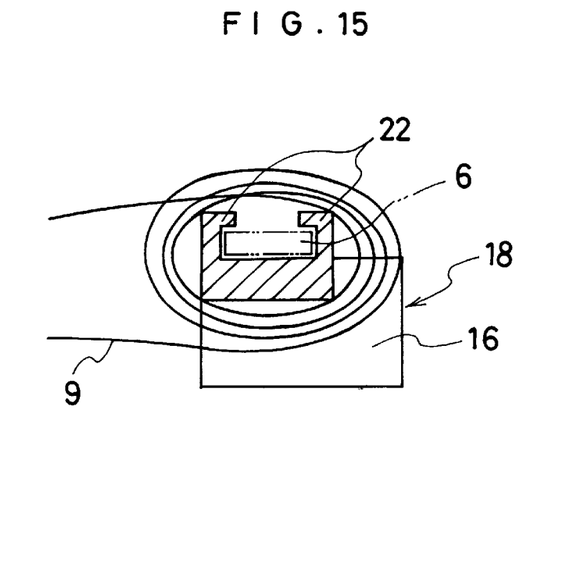
FIG. 15 is a cross-sectional view of the support member of the magnetic head shown in FIG. 14.

A modified example of the support member 18 of the eighth example of the invention is described by referring to FIG. 15. In this floating magnetic head, a support member 18 has protrusions 22. A pair of flanges 16 are formed at opposite ends of the support member 18 and thus a winding recess 17 is formed between the flanges 16. A winding 9 is wound around the recess 17 and around the winding portion of the head core 6. In this floating magnetic head, the support member 18 is bonded to the head core 6. Thus, damage to the head core 6 and deterioration in the characteristics are prevented, in the same way as the floating magnetic head shown in FIG. 13. By the accommodation of the support member 18 of the winding 9 into a recess 17 (FIG. 14), the winding 9 is kept firmly to prevent it from being deformed, thereby electrical leakage, breakage and other troubles can be prevented and the protrusions 22 prevent a rare shortcircuit due to a direct contact between the winding 9 and head core 6. The seventh and eighth examples of floating magnetic head according to the invention have the following advantages. The head core is reinforced with the support member. Therefore, if a large force acts on the head core in a subsequent step such as winding of a coil or mounting to a suspension, the core can withstand the force. Consequently, the head core is prevented from becoming damaged. Concomitantly, deterioration in the characteristics is prevented.

In the magnetic head of FIGS. 14 and 15, a winding is wound around the winding recess in the support member and around the winding on the head core. That portion of the winding which is on the side of the support member is received in the winding recess and so the winding is firmly held. The winding is prevented from being disarranged. As a result, electrical leakage, breakage, and other troubles are prevented.

Where the support member and the slider are made of the same material, the support member and the head core expand thermally at the same rate. This reduces the distortion due to the bonding to the head core.

By constructing the support member in such a way that the apex of the head core can be exposed, the surface facing the magnetic recording medium can be machined while watching the apex. This makes it possible to accurately adjust the depth of the gap.

A cover which is so shaped as to cover the corners of the winding on the head core is formed on the support member. The winding can be wound via the cover. In consequence, the winding makes no direct contact with the head core. The danger of layer short can be avoided with certainty.

A ninth example of the invention is described next by referring to FIG. 16 that is a fragmentary view of FIG. 1. It is to be noted that like components are indicated by like reference numerals in FIGS. 1, 4.

Figure 16:
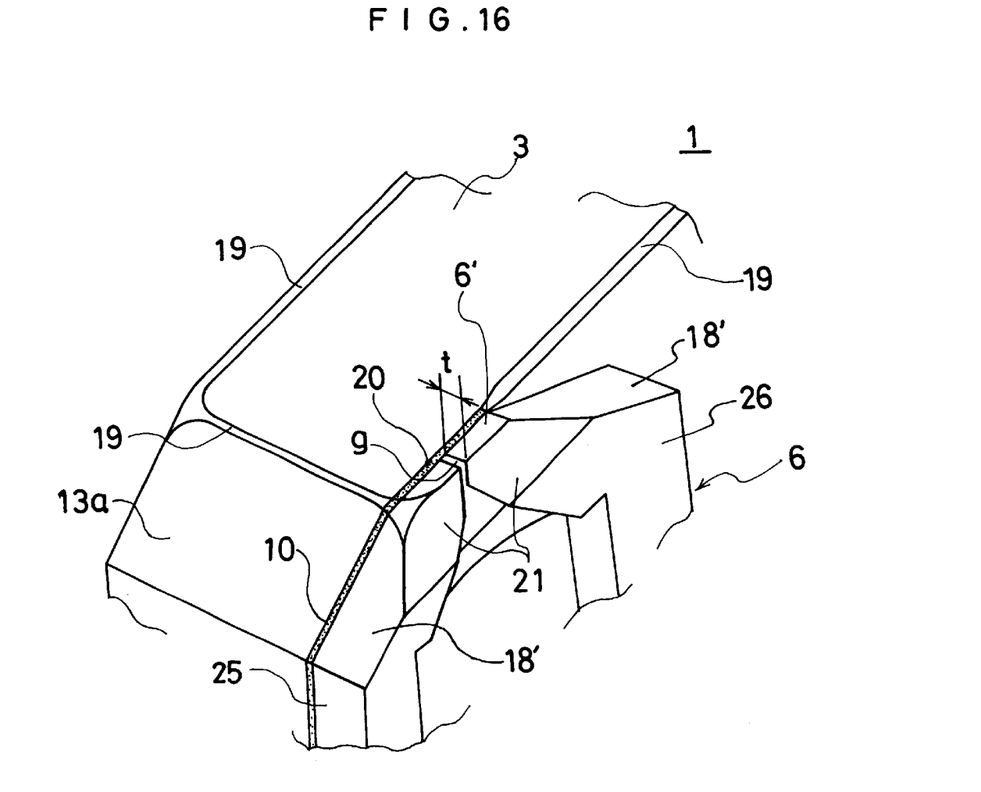
FIG. 16 is a perspective view of a nineth example of magnetic head according to the invention.

In FIG. 16, the floating magnetic head, indicated by numeral 1, comprises a substantially rectangular slider 2 made of a nonmagnetic material. The top surface of the slider 2 is opposite to a magnetic recording medium (not shown). Rails 3 and 4 (only the rail 3 is shown) are mounted on the top surface to produce a floating force.

A magnetic head core 6 including a track portion 6' having a read/write gap g is bonded via a low-melting glass 10 to the end 13a of the rail 3 on the slider 2 from which air goes out of the head. The core 6 is shorter than the slider 2. The core 6 protrudes in such a way that the track portion 6' is located on the side of the rail 3. Since the core 6 protrudes from the slider 2 in this way, the edges 19 of the rails 3 and 4 on the slider 2 can be chamfered independent of the core 6. Therefore, the width t of the track portion 6' is not required to be shortened in chamfering the slider 2.

In this case, the bonding using the low-melting glass 10 is carried out by forming a low-melting glass film on the bonded surface of the slider 2 by sputtering techniques. Alternatively, a film of the low-melting glass 10 may be formed on the bonded surface of the slider 2 by printing techniques to accomplish the bonding. In the present example, the magnetic head core 6 is bonded to the slider 2 via the low-melting glass 10. Instead, a low-melting metal or other adhesive may be employed.

The magnetic head core 6 is composed of two cores 25 and 26 which together form a substantially L-shaped form. The cores 25 and 26 are made of a single crystal of MnZn ferrite, for example. In particular, the core 6 is fabricated by forming magnetic films of Fe—Al—Si alloy on the surfaces of the cores 25 and 26 in which read/write gaps g are to be formed, forming insulating films on the magnetic films, bonding together the resulting two cores 25 and 26 via glass, and then cutting away the unwanted bonded portions. The inclined surfaces 18' of the two cores 25 and 26 forming the core 6 on the side of the air entrance end 13a have been previously chamfered at an angle.

In the present example, the magnetic films of Fe—Al—Si alloy are formed on the surfaces of the cores 25 and 26 across which the read/write gap g located on the side of the rail 3 is formed. A magnetic film of Fe—Al—Si alloy may be formed only on one of the two surfaces. Also, in the above example, the two cores 25 and 26 are made of a single crystal of MnZn ferrite. These two cores may also be made of polycrystalline MnZn ferrite.

The slider 2 and the magnetic head core 6 are machined variously in the manner described below. These various machining operations are described below in connection with the procedure for fabricating the floating magnetic head 1.

First, the magnetic head core 6 is adhesively bonded to the slider 2. Then, the side of the slider 2 on the side of the air exit end 13a is chamfered at an angle. At the same time, the edges 19 of the core 6 on the side of the air exit end 13a are chamfered at an angle automatically. Thereafter, the rails 3 and 4 on the slider 2 are lapped so that the depth of the read/write gap g in the head core 6 may assume a desired dimension.

Subsequently, the rails 3 and 4 on the slider 2 are lapped with lapping tape or the like to cut out the portion 20 of the rail 3 which is opposite to the track portion 6'. That is, the exposed edges 19 are chamfered with the lapping tape to round them.

When the edges 19 of the rails 3 and 4 on the slider 2 are chamfered with the lapping tape, the outer exposed edges (not shown) of the core 6 are also lapped. Then, the exposed outer upper portions of the head core 6 are ground to form inclined surfaces 21. As a result, the track portion 6' of a given width (6 $\mu$m in the present example) is formed. The chamfered portions of the exposed outer edges of the core 6 have the inclined surfaces 21 because of the grinding operation described above and so these chamfered portions have been abraded, and the track portion 6' of the desired width t is formed. Consequently, it is unlikely that the track width t is affected by the tape lapping.

As described above, the exposed edges 19 of the rails 3 and 4, excluding the portion 20 opposite to the track portion 6', are chamfered. Therefore, if an operation of the CSS system is performed, the medium is not damaged by the edges 19. That is, the resistance to the CSS operation is improved. This enhances the reliability and can accommodate high-density recording.

In the floating magnetic head 1 shown in FIG. 3 or 4, if measures are taken to improve the resistance to the CSS operation, then the edges either of the slider 2 or of the magnetic head core 6 are chamfered and, at the same time, the track portion 6' is chamfered. As a result, the width t of the track portion 6' may decrease. In the novel floating magnetic head 1, the magnetic head core 6 protrudes from the slider 2. This makes it possible to chamfer the slider 2 independent of the core 6. Hence, the problems intrinsic in the conventional floating magnetic head do not occur.

In the present example, the magnetic head core 6 of a given width protrudes in a parallel relation to the rail 3. However, the core 6 protrudes over a quite small distance of 6 $\mu$m. Also, the air entrance end 13a of the core 6, the air exit end 13a, and the side 21 opposite to the slider forming the track width t are chamfered at an angle. Consequently, the core provides a very small area protruding from the rails 3 and 4. Furthermore, the core is composed of surfaces forming only obtuse angles with respect to the surface opposite to the magnetic recording medium. In consequence, the resistance to the CSS operation is not adversely affected.

The ninth example of the invention is a floating magnetic head constructed as described thus far. The magnetic head core protrudes from the slider. Therefore, the edges of the surface of the core over which the medium floats can be chamfered without reducing the width of the track portion of the core. Also, the exposed edges of the top surface of the slider are chamfered. Thus, if a CSS operation is performed, the edges do not damage the magnetic recording medium. Consequently, the resistance to the CSS operation can be improved without hindering securing a track portion of an appropriate width.

What is claimed is:

1. A floating magnetic head comprising:

a substantially rectangular slider having a top surface and a bottom surface, the slider made of a non-magnetic substance, and having a first end defining a leading end and a second end defining a trailing end, the slider being provided with a groove on an outside surface of the slider, wherein the groove extends from a side surface toward the second end such that the groove gradually increases in depth from the side surface towards the second end and forms an opening at the second end, the side surface located between the first end and the second end and between the top surface and the bottom surface;

rails provided on an air-bearing side of the slider that faces a recording medium to produce a floating force;

a magnetic head core bonded to the side surface of the slider external to the rails by a glass bonding layer between them, the magnetic head core having an inclined face on a side opposite to the bonding side, the magnetic head core having a track portion and a read/write gap and having first and second legs, the second leg being located at the second end of the slider without protruding from the second end such that the first leg is located between the second leg and the first end of the slider, the track portion of the magnetic head core being attached externally outside of the rails by bonding; and a coil wound around the second leg, the coil being at least partially in the groove, wherein the edges completely surrounding the rails on the slider are round-chamfered except adjacent the track portion.

2. The floating magnetic head of claim 1, wherein the length of the magnetic head core is more than one-tenth but no more than one-half of the length of the slider.

* * * * *